United States Patent [19]
Decoux

[11] Patent Number: 5,261,759
[45] Date of Patent: Nov. 16, 1993

[54] REDUCED OBSTRUCTION SELF-SEALING FASTENERS FOR MULTI-LAYER PANELS

[75] Inventor: Steven P. Decoux, Long Beach, Calif.

[73] Assignee: Rockwell International Corporation, Seal Beach, Calif.

[21] Appl. No.: 895,753

[22] Filed: Jun. 9, 1992

[51] Int. Cl.$^5$ .............................................. F16B 31/00
[52] U.S. Cl. ..................................... 403/408.1; 403/2; 411/399
[58] Field of Search ................... 403/408.1, 2; 52/787; 411/392, 399

[56] References Cited

U.S. PATENT DOCUMENTS

| | | | |
|---|---|---|---|
| 3,434,262 | 3/1969 | Lawrence | 52/787 |
| 3,564,798 | 2/1971 | Darby et al. | 52/787 X |
| 3,606,416 | 9/1971 | Hatter et al. | 403/408.1 |

Primary Examiner—Randolph A. Reese
Assistant Examiner—Anthony Knight
Attorney, Agent, or Firm—Terrell P. Lewis; Charles T. Silberberg

[57] ABSTRACT

A fastener system for securing a multi-layer panel having a first surface adapted to be secured to a substructure, a second surface awash in a fluid flowing thereacross, and a plurality of spaced fastener-receiving holes arranged in a predetermined array in the second surface. Each fastener includes a threaded shank having a diameter smaller than any of the fastener-receiving holes, a load-bearing flange located adjacent the shank having a diameter greater than the shank diameter for pressing the first surface of the panel against the substructure, an unthreaded shank extending away from the load-bearing flange and having a diameter smaller than the threaded shank diameter, and a second flange having a diameter greater than the diameter of the load-bearing flange. The second flange is located on the side of the unthreaded shank opposite the load-bearing flange, and functions to seat against a recessed region of the second surface of the panel. A surface on the second flange adjacent the unthreaded shank engages with and seals against a correspondingly configured recess in the panel second surface.

14 Claims, 2 Drawing Sheets

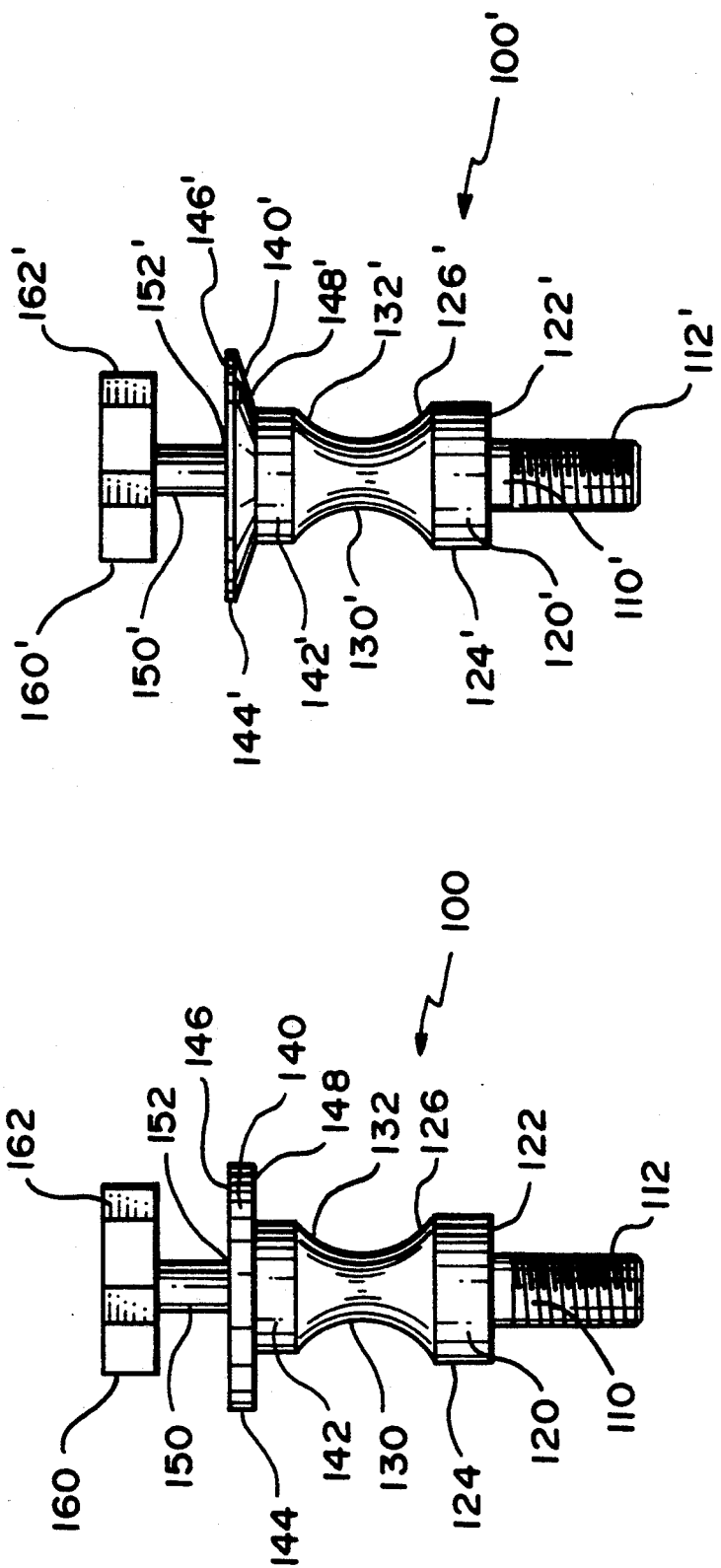

REDUCED OBSTRUCTION SELF-SEALING FASTENERS FOR MULTI-LAYER PANELS

BACKGROUND OF THE INVENTION

1. Field of the Invention

The present invention relates to reinforced laminar flow control (LFC) structures used in aerospace applications, and more particularly to threaded fasteners used to secure truss core LFC panel structures to underlying aircraft substructures, such that the head of each fastener lies flush with, and seals the opening in the outer surface of the LFC panel structure through which the fastener has been inserted, while a load-bearing portion adjacent the fastener threads functions to secure the panel structure to the underlying substructure.

2. Background of the Invention

Recently, designers of aerospace vehicles developed skin or panel structures which have facilitate conformance of moving air or other fluid to the surface over which it flows. Such structures, known as laminar flow control (LFC) structures, in recent years have taken the form of reinforced truss core panel members. These panel members must be secured to underlying airframe substructures via suitably chosen fastening systems.

One of the most critical difficulties in securing these structures to the airframe is in maintaining the precision of fit of the secured parts. Often manufacturing tolerances of the panel structures as well as the fastening mechanisms present the greatest obstacles in achieving the desired precision. To overcome this problem, fastening systems of various forms have been tried, from simple fasteners, such as rivets or bolts, to more complex devices, such as intricate latching mechanisms. Still, precision of fit remains a problem.

Moreover, the key objective of today's aerospace industry is to achieve optimum laminar flow. Thus, flow contacting surfaces of fastened panels, as well as of the fasteners securing the panels must present surfaces which act to minimize turbulence of the moving fluid. To date, no known system achieves these objectives.

OBJECTS AND SUMMARY OF THE INVENTION

It is therefore an object of the present invention to provide a novel fastening system for laminar flow control panel structures which will provide precise and secure attachment to underlying airframe substructures, and which will overcome all the deficiencies and drawbacks of currently known systems of like kind for attachment of such laminar flow control structures.

Another object of the present invention is to provide a novel fastener construction for simultaneously securing the laminar flow control panel to the underlying airframe substructure and sealing the aperture in the panel into which the fastener is inserted prior to attachment to the underlying substructure.

These and other objects are achieved by providing a fastener system adapted for securing a laminar flow control panel, comprised of a reinforced multi-layer member typically having at least inner and outer panel skins (and more preferably being of the type comprising a truss core construction), to underlying airframe substructures, as for example a wing or body support.

In particular, the fastener system includes a plurality of fasteners arranged at appropriate fastening locations, each having a conventionally threaded shank for attachment to the underlying substructure, an extended shank member including a first flange portion and a second flange portion spaced apart by a distance equal to the distance between the inner and outer surfaces of the panel, and exhibiting characteristics of the type described in detail below.

BRIEF DESCRIPTION OF THE DRAWINGS

FIG. 1 is a side sectional view of a fastener element in accordance with the teachings of the present invention; and FIG. 2 is a side sectional view of a variation of the fastener element of FIG. 1 in accordance with the teachings of the present invention.

DETAILED DESCRIPTION OF THE INVENTION

Figure 3:
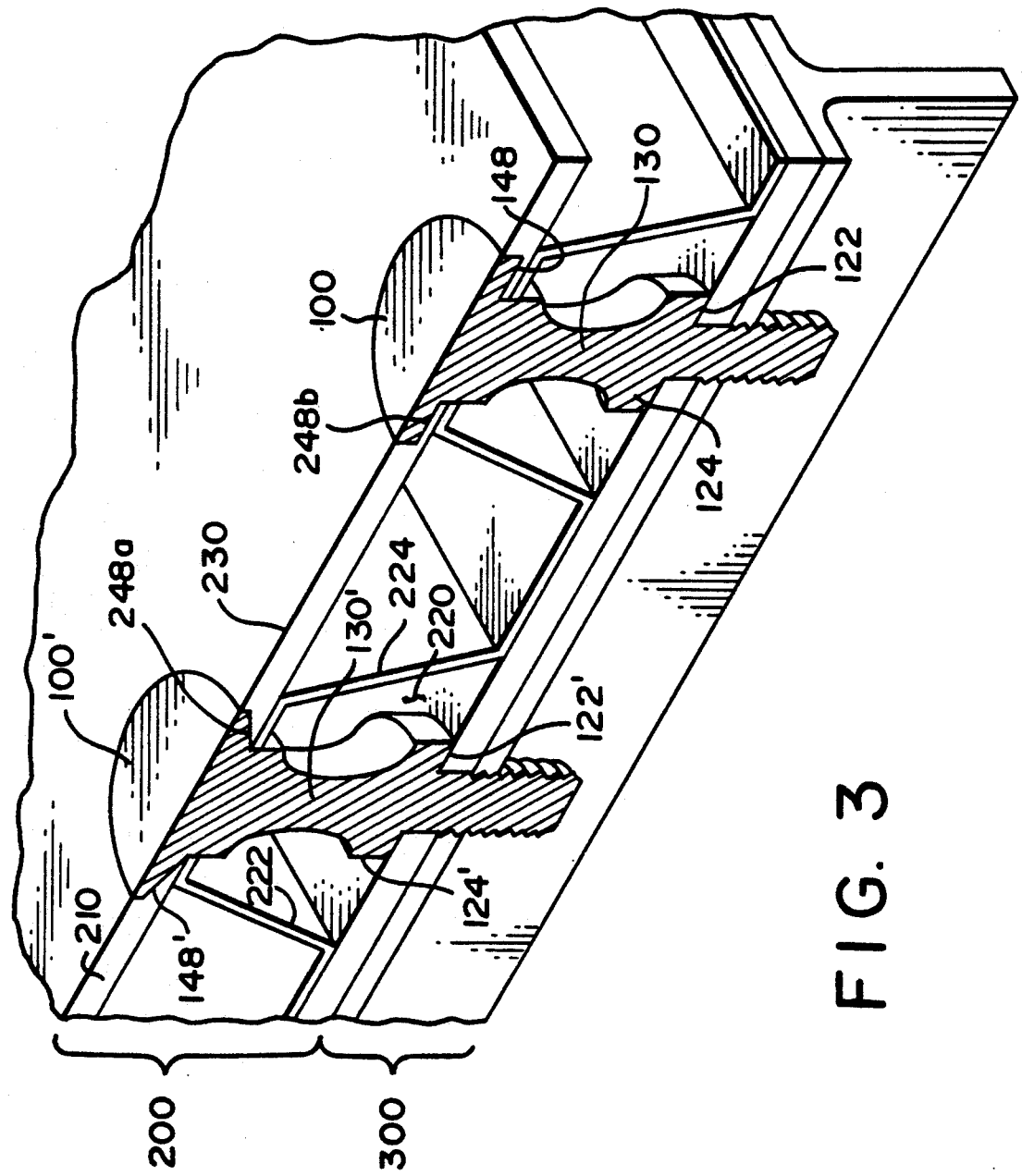
FIG. 3 shows a section of a multi-layer (e.g., a truss core) panel with the two fasteners illustrated in FIGS. 1 and 2 disposed in respective positions securing the panel to an airframe underlying substructure.

Referring now to FIGS. 1 and 2, there are shown two fasteners 100 and 100', respectively, contemplated by the present invention. These fasteners are essentially identical in structure with the exception of the undersurface of the second flange portion 140, 140' (as will be explained below). The following description is directed to the fastener shown in FIG. 1; however, the fastener shown in FIG. 2 exhibits similar structure which can be identified by the use of the similar ("primed") reference numerals used in both Figures.

In FIG. 1, the fastener 100 includes a first shank portion 110, a first flange portion 120, a second shank portion 130, a second flange portion 140, a third shank portion 150 and a third flange portion 160. The first shank portion 110 is preferably provided with conventional bolt threads 112 having an angle of inclination relative to the longitudinal axis of the fastener shank portions suitable for the retention needs of the bolt system.

The first flange portion 120 has a lower planar surface 122, a circular periphery 124 which is concentric with the first shank portion 110 and which has a diameter greater than the diameter of the first shank portion, and an upper surface 126.

The second shank portion 130 has a diameter which is less than the diameter of the first shank portion 110 and a length which approximates the distance between the inner and outer panel layers. The lower region of the second shank portion merges with the upper surface 126 of the first flange portion in a contoured manner.

The second flange portion 140 has a lower section 142 of circular configuration having a diameter no greater than the diameter of the first flange portion 120. A flange 144, having an upper face 146 and a lower face 148, is situated atop the lower section 142 and exhibits a circular periphery concentric with the first shank portion and the first flange portion. The diameter of the flange 144 is greater than the first shank portion 122. The upper region of the second shank portion 132 merges with the lower section 142 of the second flange portion 140, and the lower region of the second shank portion merges with the upper surface 126 of the first flange portion to define a concave exterior surface on the second shank portion 130.

Situated atop the second flange portion 140 is a third shank portion 150 and a third flange or nut member 160. The lower end of the shank portion 150 is designed so that, after a torque in excess of a predetermined amount is applied to the flange member 160, the shank portion lower end 152 separates from (twists off) the upper face 146 of the flange 144 of the second flange portion. Nut member 160 is shown as including faces 162, 162' adapted for engagement by conventional torque applying tools.

The fastener of FIGS. 1 and 2 are substantially identical, with the exception of the lower faces 148 and 148' of the second flange portions 140 and 140', respectively. In the fastener of FIG. 1, the lower face 148 is substantially perpendicular to the longitudinal axis of the first, second and third shanks. In the fastener of FIG. 2, the lower face 148' is disposed at an oblique angle relative to the longitudinal axis of the first, second and third shanks. The function of the lower faces 148 and 148' will be described in connection with the structure illustrated in FIG. 3.

Referring now to FIG. 3, there is shown a laminar flow control multi-layer panel member 200 fastened to an underlying substructure 300 with fasteners 100 and 100' provided in predetermined opening locations in the panel member 200.

The internal layers of the panel member 200 illustrated in FIG. 3 are of the type known as truss core panel layers, which when the panel is fabricated, exhibit characteristics of corrugated members. Such truss core panels are well known in the art, and no claim to novelty for such panels, per se, is made in this application. However, it is to be noted that when using truss core panels with the fasteners of the present invention, the fasteners are preferably to be located substantially centrally of the channels 220 formed between corrugation sidewalls 222, 224. When used in this manner, it can be seen that the necked shank region 130, 130' of the fastener presents minimum obstruction to the cross-sectional area of the channels 220, and thus in applications where fluid flows within the channels, interference with the flow is minimized.

It is also to be noted that when the fasteners are properly secured in their respective apertures, the top surface of the fastener "cap" portion 140 lies substantially flush with the top surface 230 of the panel. In this manner, the fastener cap portion maintain integrity of a fluid-tight seal with the panel top surface to contain the hydraulic fluid system within the panel.

Moreover, the "cap" portion top surface and the panel outer skin present a substantially unbroken, smooth surface without any discontinuities to any flowing fluid environment within which the outer skin outer surface is awash, so that laminar flow control at the panel outer skin can be achieved.

As shown, the second flange portions 140, 140' of the fasteners 100 and 100', respectively bear against correspondingly configured aperture seats in the outer skin 210 of the panel 200. Thus, the fastener 100' shown on the left side of FIG. 3 has its surface 148' bearing against a correspondingly configured surface 248a in the outer skin 210 of the panel. Similarly, the fastener 100 shown on the right side of FIG. 3 will have its surface 148 positioned adjacent a correspondingly configured seat 248b in a sealing manner. It is contemplated that an appropriate sealing compound or material (as discussed below) will be applied to the underside of the fastener at surface 148 or 148' so that a fluid-tight leak-proof seal can be obtained.

The first, load-bearing flange portions 124, 124' of the fasteners 100 or 100' are brought to bear against the inner skin of the panel via the threaded shank. The surfaces 122, 122' press against the panel inner skin and transfer the securing load to the load-bearing flange portions. Neck portions 130, 130' interconnect the load-bearing flange 124, 124' with the "cap" portion 140, 140' of the fasteners.

Thus it is apparent that there has been provided, in accordance with the present invention, a novel fastener and fastening system for securing a multi-layer panel to underlying substructure which is simple in construction and function, requires relatively small cost to manufacture, and yet fully satisfies the objectives, aims, and advantages set forth above.

The multi-layer panel contemplated by the present invention can take the form of a truss core panel having inner and outer skin members. The skin members can be solid as when the panel's principal function is structural, or the skin members can be perforated to permit passage of fluid between the ambient and the interior of the panel, as when the panels are used for laminar flow control applications.

In accordance with the invention, fastener-receiving apertures are provided through the thickness of the panel according to predetermined design requirements, and in advance of assembly of the panel to the underlying substructure.

The fasteners include upper and lower flanges which provide separate and distinct functions. The lower flange of the fastener provides a load-bearing surface for holding one layer of the multi-layer panel against the underlying substructure. The upper flange includes a surface that coacts with an outer layer of the panel to seal and maintain the interior of the multi-layer panel at a predetermined positive or negative pressure. The upper and lower flanges are connected by a distinct separate necked region which is configured to minimize fluid flow obstruction as well as to maintain the second flange or "cap" portion in a sealed and seated position.

The upper fastener flange provides no load-bearing function. Its sole purpose is to seal the aperture through which it has been inserted, while eliminating distortion of the outer skin of the multi-layer panel member. This is particularly important since the layers of the panel member, and the panel member itself, may be extremely thin (for example, on the order of 0.025" to 0.040").

The upper flange also assists in preventing ingress of fluid through the fastener-receiving aperture in the panel member's outer skin into the interior of the panel member when the fastener upper flange is brought to bear against the outer skin. Contributing to preventing leakage of fluid into or out of the panel member interior is a sealing material which is disposed below the undersurface of the upper flange. Such a sealing material can be polysulfide, silicone or polyurethane, or any other equivalent materials.

As has been illustrated in FIG. 3, the interior sheets of the multi-layer panel 200 delimit channels or flow paths within which fluids (e.g., cooling fluids or pressurized fluids) can be passed. With the inner and outer skins of the panel member 200, a hydraulic fluid transport system is formed which must be maintained at a predetermined level of positive or negative pressure. The fasteners of the present invention maintain the integrity of this system by preventing leakage at the fastener-receiving apertures, while securing the panel member to its underlying substructure.

While the invention has been described relative to specific embodiments thereof, it also embraces any alternatives, modifications, and variations that will be apparent to those skilled in the art in light of the foregoing description, and which fall within the spirit and scope of the appended claims.

What I claim is:

1. A fastener system for securing a multi-layer laminar flow control panel to an underlying substructure, said panel having one surface awash in a fluid flow and a plurality of spaced fastener-receiving holes arranged in a predetermined array in said surface, said system comprising:

a plurality of fasteners, each of said fasteners including a threaded shank, having a diameter smaller than any of said panel fastener-receiving holes, for attaching said fastener to the underlying support structure, a load-bearing flange unitary with and located adjacent said shank, said load-bearing flange having a diameter greater than said shank diameter, said flange adapted to seat on a first surface of said panel adjacent said underlying support structure, and urge said panel first surface into secure contact with said underlying support structure, an unthreaded shank, unitary with said load bearing flange, extending away from said load-bearing flange on the side opposite said threaded shank, and a non load-bearing second flange, having a diameter greater than said load-bearing flange, on the side of said unthreaded shank opposite said load-bearing flange, said second flange seating against a recessed region of said panel, said second flange having a surface adjacent said unthreaded shank which is drawn into sealing engagement against said recessed region in said truss core panel.

2. The system of claim 1, wherein said second flange is disposed at an angle to said unthreaded shank and includes a surface located opposite said second surface which is circular in plan.

3. The system of claim 1, wherein said second flange surface comprises a planar region disposed at substantially ninety degrees to the unthreaded shank.

4. The system of claim 1, wherein said second flange surface comprises a substantially planar region disposed at an acute angle to the opposing circular surface of said second flange.

5. The fastener system of claim 1, wherein said panel includes an upper face sheet, a lower face sheet and a truss core disposed between the upper and lower face sheets, said truss core defining channels through which fluid flows, and said unthreaded shank has a diameter smaller than the diameter of said threaded shank, whereby when each said fastener has been secured in said underlying structure, fluid flowing in said channels passes therethrough without being obstructed by said unthreaded shanks.

6. A fastener for securing a multi-layer panel to an underlying support member, the panel including an upper surface-defining layer, a lower surface-defining layer, and at least one channel-defining truss core disposed between the upper and lower surface-defining members, the fastener being adapted to be received in a fastener-receiving hole extending through all layers of said panel, said fastener comprising:

a threaded shank having a diameter smaller than the diameter of said fastener-receiving hole, for threaded engagement with a hole of similar diameter in said underlying support member;

a load-bearing flange unitary with, and located adjacent said shank, said load-bearing flange having a diameter greater than said shank diameter and being adapted to urge said lower layer of said panel into secure engagement with said underlying support structure;

an unthreaded shank unitary with said load-bearing flange and having a diameter smaller than said threaded shank diameter, said unthreaded shank extending away from said load-bearing shank on the side opposite said threaded shank, and another flange unitary with said unthreaded shank and disposed on the side of said unthreaded shank opposite said load-bearing flange, said another flange having a diameter greater than said load-bearing flange and being adapted to snugly engage an exterior surface of said panel upper layer.

7. The fastener of claim 6, wherein the exterior surface of the panel upper layer comprises a recess and said another flange includes a sealing surface located adjacent said unthreaded shank and correspondingly configured with the recess, said sealing surface being drawn toward and into contact with the recess to effect a sealing engagement as said fastener is moved into engagement with said underlying support structure.

8. The fastener of claim 7, wherein said sealing surface of said another flange extends at a substantial right angle to the exterior surface of said unthreaded shank.

9. The fastener of claim 7, wherein said sealing surface of said another flange extends at an angle of greater than 90° to the exterior surface of said unthreaded shank.

10. The fastener of claim 7, wherein said sealing surface is coated with a sealing material.

11. The fastener of claim 6, wherein said another flange snugly engages said panel upper layer without transferring loads thereto, so as to prevent deformation of said upper panel layer.

12. A method for fastening a multi-layer truss core panel to an underlying support structure wherein the panel includes an upper surface member, a lower surface member, at least one channel-defining member disposed between the upper and lower surface members; and a plurality of through holes in the panel and the underlying support structure, said method comprising:

(1) providing fasteners for engagement in respective ones of the holes of said panel and said underlying support structure, each said fastener including (a) a threaded shank for insertion through the through hole in said panel and into the through hole in said underlying support structure, (b) a first flange unitary with said threaded shank and having an outer diameter greater than the outer diameter of said threaded shank, (c) an unthreaded shank unitary with said first flange and having an outer diameter smaller than the outer diameter of said threaded shank, (d) a second flange unitary with said unthreaded shank and having a diameter greater than the outer diameter of said first flange, and (e) a fastener-driving means unitary with said second flange yet removably secured thereto, said fastener-driving means extending away from said second flange on the side thereof opposite said unthreaded shank, (2) inserting each fastener into a respective through hole in the panel until the threaded shank enters the through hole in said underlying support structure, (3) driving said threaded shank into engagement with the through hole in said underlying support structure until said first flange is drawn against said panel lower layer, and (4) further driving said threaded shank into said through hole so that said fastener is anchored in said underlying support structure, whereupon said a surface of said flange is drawn snugly against an area of the upper panel layer surrounding the through hole to seal the interior of said channel defining member from the environment above the upper panel layer.

13. The method of claim 12, wherein the step of driving said threaded shank into engagement with said underlying support structure comprises grasping said fastener driving means and imparting rotational movement to said fastener.

14. The method of claim 13, wherein following said step of further driving said threaded shank into said through hole to anchor said fastener in said underlying support structure, said fastener driving means is rotated relative to said second flange to thereby force separation of said fastener driving means from said second flange.

* * * * *